US009166769B2

(12) United States Patent
Lee

(10) Patent No.: US 9,166,769 B2
(45) Date of Patent: Oct. 20, 2015

(54) DATA TRANSMISSION METHOD AND DATA RESTORATION METHOD

(71) Applicant: AnaPass Inc., Seoul (KR)

(72) Inventor: Yong Jae Lee, Gyeonggi-do (KR)

(73) Assignee: ANAPASS INC., Seoul (KR)

( * ) Notice: Subject to any disclaimer, the term of this patent is extended or adjusted under 35 U.S.C. 154(b) by 0 days.

(21) Appl. No.: 14/036,107

(22) Filed: Sep. 25, 2013

(65) Prior Publication Data

US 2014/0092919 A1    Apr. 3, 2014

(30) Foreign Application Priority Data

Sep. 28, 2012   (KR) .................. 10-2012-0109243

(51) Int. Cl.
*H04L 7/00* (2006.01)
*H04L 25/49* (2006.01)

(52) U.S. Cl.
CPC .............. *H04L 7/0025* (2013.01); *H04L 25/49* (2013.01); *H04L 25/4904* (2013.01)

(58) Field of Classification Search
CPC ................................. H04L 7/0025
USPC .......................... 370/474, 445, 252
See application file for complete search history.

(56) References Cited

U.S. PATENT DOCUMENTS 7,436,904 B2 * 10/2008 Kwak ............................ 375/316
7,920,115 B2 *  4/2011 Park ............................... 345/89
8,074,125 B2 * 12/2011 Lee ............................... 714/700
8,077,166 B2 * 12/2011 Yeon ............................. 345/204

FOREIGN PATENT DOCUMENTS

JP           02096982      4/1990

* cited by examiner

*Primary Examiner* — Rasheed Gidado
(74) *Attorney, Agent, or Firm* — Paratus Law Group, PLLC

(57) ABSTRACT

Disclosed are a data transmission method and a data restoration method. The data transmission method includes forming a plurality of transmission preparatory packets by dividing data to be transmitted by the predetermined number (n) of bits, forming transition inducing packets different from the transmission preparatory packets while having the predetermined number (n) of bits, forming transition included data packets by performing a logical operation on the transition inducing packet and each of the transmission preparatory packets, and transmitting the transition included data packets and the transition inducing packet.

23 Claims, 11 Drawing Sheets

FIG. 2
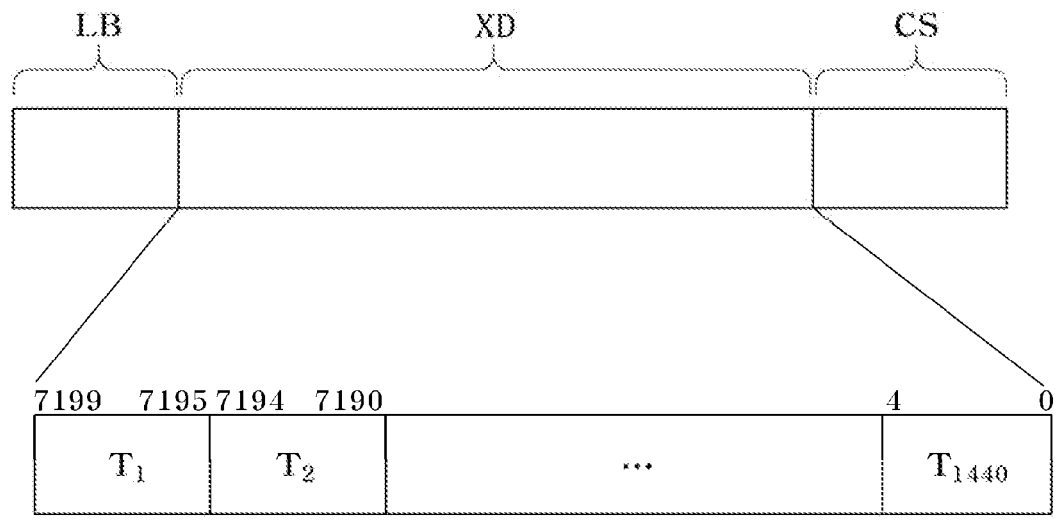
(a)
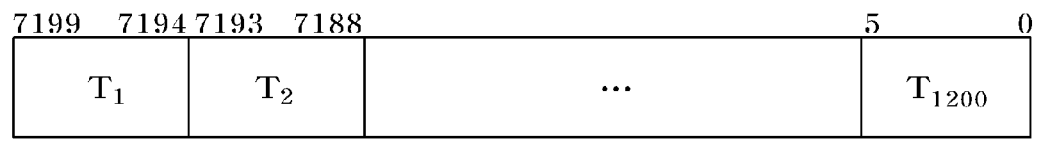
(b)
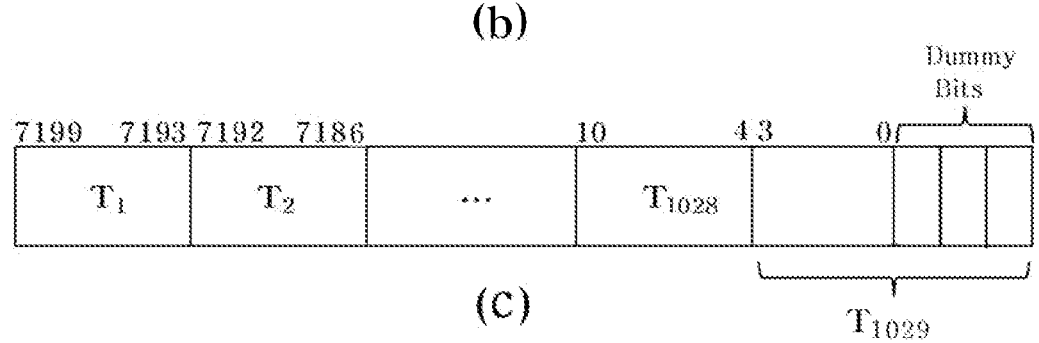
(c)

FIG. 3

| T | E |
|---|---|
| 0 0 0 —① | 0̶ 0̶ 0̶ —① |
| 0 0 1 | 0̶ 0̶ 1̶ —③ |
| 0 1 0 —② | 0̶ 1̶ 0̶ —② |
| 0 1 1 —④ | 0̶--1̶--1̶---④ |
| 1 0 0 | 1̶---0̶--0̶---④ |
| 1 0 1 | 1̶ 0̶ 1̶ —② |
| 1 1 0 —③ | 1̶ 1̶ 0̶ —③ |
| 1 1 1 | 1̶ 1̶ 1̶ —① |

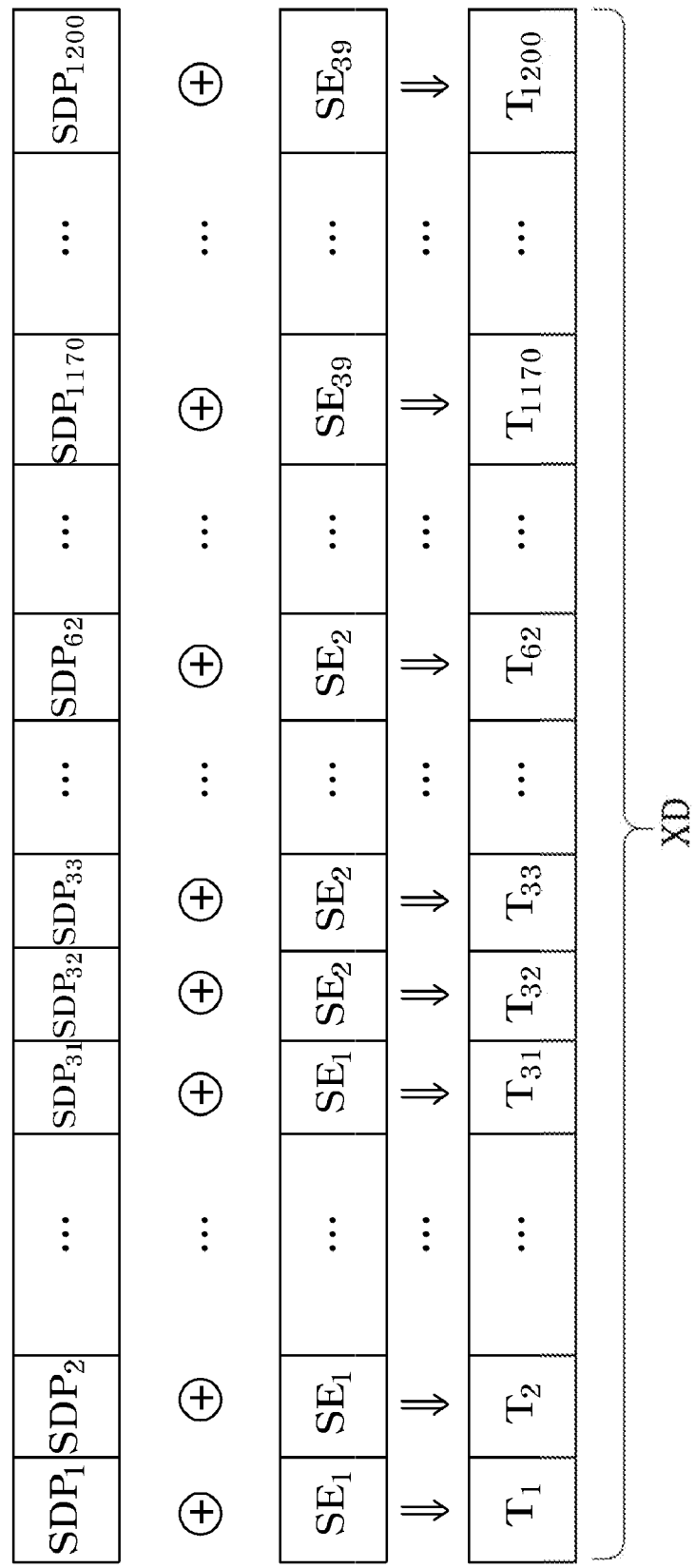

DATA TRANSMISSION METHOD AND DATA RESTORATION METHOD

CROSS-REFERENCE TO RELATED APPLICATION

This application claims priority to and the benefit of Korean Patent Application No. 2012-0109243, filed on Sep. 28, 2012, the disclosure of which is incorporated herein by reference in its entirety.

BACKGROUND

1. Field of the Invention

The present invention relates to a data transmission method and a data restoration method.

2. Discussion of Related Art

As interface technologies between a timing control unit and a data driving unit of a conventional display, a point to point differential signaling (PPDS) method that was released by National Semiconductor may be used. In the PPDS method, an independent data circuit is formed between the timing control unit and the driving unit. Such a PPDS method has an advantage that electromagnetic interference (EMI) is reduced and the number of overall signal lines is reduced, compared to a conventional reduced swing differential signaling (RSDS) method and a conventional mini-low voltage differential signaling (LVDS) method. A clock line and a load line are connected between the timing control unit and a plurality of data driving units.

In the conventional technologies, a separate transmission line is required to transmit clock signals. That is, since the clock signals are transmitted from the timing control unit to each of the plurality of data driving units through a separate line from data signals, a separate line for transmitting the clock signals is required, and therefore this causes an increase in complexity of the wiring, an increase in complexity of the manufacturing process, and an increase in the manufacturing costs. In addition, the clock signals having high frequencies may enable EMI to be increased, and when skew occurs between the data signals and the clock signals transmitted through the separate line, an error may occur at the time of data sampling.

SUMMARY OF THE INVENTION

The present invention is directed to a method of transmitting data with high efficiency and a method of restoring the transmitted data. In addition, the present invention is also directed to a data transmission method which may reduce electromagnetic interference (EMI) by transmitting data together with clock information. In addition, the present invention is also directed to a data transmission method and a data restoration method, which may solve problems such as skew and jitter by transmitting data together with clock information.

According to an aspect of embodiment of the present invention, there is provided a data transmission method including: forming a plurality of transmission preparatory packets by dividing data to be transmitted by the predetermined number (n) of bits; forming transition inducing packets different from the transmission preparatory packets while having the predetermined number (n) of bits; forming transition included data packets by performing a logical operation on the transition inducing packet and each of the transmission preparatory packets; and transmitting the transition included data packets and the transition inducing packet.

According to another aspect of embodiment of the present invention, there is provided a data restoration method including: receiving a transition inducing packet and a transition included data packet; restoring a clock using the received transition included data packet and the received transition inducing packet; sampling the transition inducing packet and the transition included data packet using the restored clock; and restoring transmitted data by performing a logical operation on the sampled transition inducing packet and the sampled transition included data packet.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 2 is a schematic diagram illustrating pixel data (XD) to be transmitted and a structure of a transmission preparatory packet;

FIG. 3 is a diagram illustrating a method of forming a transition inducing packet;

FIG. 11 is a schematic diagram illustrating a configuration of sampling pixel data from a transition included data packet.

DETAILED DESCRIPTION OF EXEMPLARY EMBODIMENTS

Figure 1:
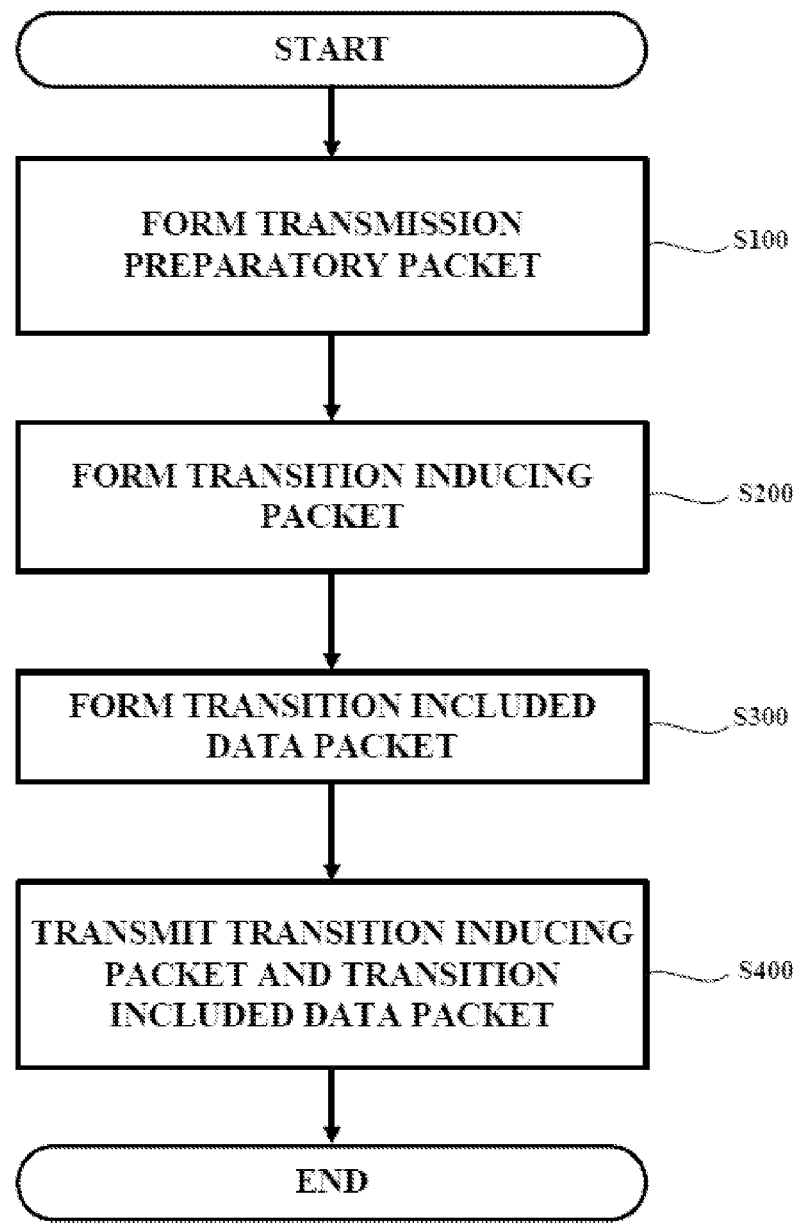
FIG. 1 is a schematic flowchart illustrating a data transmission method according to an embodiment of the present invention.

Example embodiments of the present invention are disclosed herein. However, specific structural and functional details disclosed herein are merely representative for purposes of describing example embodiments of the present invention, and example embodiments of the present invention may be embodied in many alternate forms and should not be construed as being limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings. FIG. 1 is a schematic flowchart illustrating a data transmission method according to an embodiment of the present invention, and FIG. 2 is a schematic diagram illustrating a structure of pixel data (XD) to be transmitted and a transmission preparatory packet(T). Referring to FIGS. 1 and 2, the data transmission method according to an embodiment of the present invention includes operation S100 for forming a plurality of transmission preparatory packets by dividing data to be transmitted by the predetermined number (n) of bits, operation S200 for forming transition inducing packets different from the transmission preparatory packets while having the same number of bits as the transmission preparatory packets, operation S300 for forming transition included data packets by performing a logical operation on the transition inducing packet and each of the transmission preparatory packets, and operation S400 for transmitting the transition included data packets and the transition inducing packet.

According to an embodiment of the present invention, when a timing controller (not shown) transmits j bits of data for each channel to k channels, (j×k) bits of pixel data (XD) except a line blank (LB) region and a control signal (CS) should be transmitted to a display driver. By dividing (j×k) bits of pixel data (XD) by the predetermined number of bits, a transmission preparatory packet may be formed. As an example, as shown in FIG. 2A, when transmitting a total of 7200 bits of pixel data (XD) to the display driver, the total 7200 bits of pixel data (XD) may include 1440 transmission preparatory packets T1, T2 . . . T1440 each with 5 bits from a most significant bit (MSB) to a least significant bit (LSB). As an another example, as shown in FIG. 2B, when transmitting a total of 7200 bits of pixel data to the display driver, the total 7200 bits of pixel data (XD) may include 1200 transmission preparatory packets T1, T2 . . . T1200 each with 6 bits. As still another example, there is a case in which the total number of bits of the pixel data cannot be divided by the number of bits of the transmission preparatory packet. In this case, as shown in FIG. 2C, the required number of dummy bits are inserted to form the transmission preparatory packet. For example, as described above, when the pixel data (XD) is a total of 7200 bits and the number of bits of the transmission preparatory packet is 7, 1028 transmission preparatory packets may be formed, and 4 bits remain without forming the transmission preparatory packet. In this case, 3 dummy bits are added to form 1029th transmission preparatory packet T 1029. Content of the added dummy bits may have any form such as 101, 110, or the like.

However, this is merely for describing an embodiment of the present invention, and not intended to limit the present invention. Thus, the number of bits of the transmission preparatory packet may be determined as a different value. As another example, although not illustrated, an LSB to an MSB are aligned to form the transmission preparatory packet.

In general, a packet refers to a bundle of data bits which are transmitted through a network while having a header and a payload, but in the present specification, refers to a bit bundle obtained by dividing data to be transmitted so that the data has the predetermined number of bits.

Referring to FIGS. 1 and 3, in operation 200, the transition inducing packet (E) is formed. In an embodiment, a logical operation is performed on the transition inducing packet (E) and the predetermined number of transmission preparatory packets (T) to form data packets (DP) which are transmitted to the display driver (see FIG. 5), and at least one transition from 0 to 1 or from 1 to 0 is formed between adjacent bits in each data packet (DP) by the logical operation with the transition inducing packet (E). The transition inducing packet (E) acts to form a transition in the data packet which is transmitted to a data driver in a process of transmitting data as described above. In addition, in a process of restoration data, as will be described later, the transition inducing packet (E) serves as a seed of data restoration in the process of restoring data. Thus, the transition inducing packet (E) may be transmitted together with transition included data packets (DP).

In an embodiment, when an exclusive OR (XOR) operation is performed as an example of the logical operation which will be described later, the transition inducing packet (E) should not be equal or complementary to the transmission preparatory packet in order to form at least one transition in the transmission packet that is an operation result. As an example, it is assumed that the transmission preparatory packet and the transition inducing packet all have 3 bits. When the transmission preparatory packet (T) is 101, the transition inducing packet (E) should not be 101 or 010 which is equal or complementary to the transmission preparatory packet. In this case, when an XOR operation is performed on the transmission preparatory packet and the transition inducing packet, a result such as 000 or 111 is obtained, so that transition is not included in the operation result.

When the transition inducing packet (E) and the transmission preparatory packet (T) all have n bits, a single transition inducing packet (E) may be formed using $2^{(n-1)}-1$ mutually different transmission preparatory packets at maximum. Referring to FIG. 3, the left column indicates all cases of the transmission preparatory packet (T) enabled with 3 bits, and the right column indicates transition inducing packets also enabled with 3 bits. When the transmission preparatory packet to be initially transmitted is 000(①), 000 or 111 which is equal or complementary to the transmission preparatory packet cannot be used as the transition inducing packet in order to form a transition in the transmission packet. When a second transmission preparatory packet is 010(②), 010 or 101 cannot be used as the transition inducing packet in the same manner. When a third transmission preparatory packet is 110(③), 110 or 001 cannot be used the transition inducing packet. Subsequently, when 011 is a next transmission preparatory packet(④), 011 or 100 which is equal or complementary to the corresponding transmission preparatory packet cannot be used as the transition inducing packet, and therefore 3 bits of all transition inducing packets as shown in FIG. 3 cannot be used. Thus, at least one transition inducing packet with 3 bits may be obtained from 3 transmission preparatory packets which are different from each other, and conversely, three transition included data packets at maximum may be formed from one transition inducing packet with 3 bits.

Therefore, the following conclusions are reached. $2^{(n-1)}-1$ mutually different transmission preparatory packets with n bits at maximum are required in order to form one transition inducing packet with n bits. This is for the following reasons. When the number of cases of all transition inducing packets enabled with n bits is $2^{(n)}$ and one transmission preparatory packet with n bits is determined, two transition inducing packets cannot be used. Thus, the number of mutually different transmission preparatory packets which prevents $2^{(n)}$ transition inducing packets (E) from all being used is $2^{(n)}/2$, and therefore at least one transition inducing packet with n bits may be formed using $2^{(n-1)}-1$ mutually different transmission preparatory packets (T) at maximum.

The above-described number of mutually different transmission preparatory packets for forming one transition inducing packet is the maximum number, and it is possible to form a transition inducing packet with transmission preparatory packets numbering less than the maximum. As an embodiment, one transition inducing packet with 3 bits may be formed using $2^{(3-1)}-1=3$ transmission preparatory packets at maximum as described above, and it is also possible to form the transition inducing packet using two or one transmission preparatory packets, which is fewer than the maximum number. For example, the transition inducing packet such as 100 or 011 which is not equal or complementary to the transmission preparatory packet of 010 may be formed from the transmission preparatory packet of 010. As another embodiment, one transition inducing packet with 6 bits may be formed using $2^{(6-1)}-1=31$ transmission preparatory packets (6 bits) at maximum, or and may also be formed using 30 or 29 transmission preparatory packets, i.e., fewer than 31 transmission preparatory packets.

In an embodiment, since the transition inducing packet (E) is transmitted together with the transition included data packet to be also used to restore data, the transition inducing packet should include a transition. Thus, it is necessary to perform a transition between at least two adjacent bits of the transition inducing packet (E). Thus, the transition inducing packet is formed in such a manner that transition is necessarily performed between predetermined adjacent bits of the transmitted transition inducing packets E1, E2 . . . . As an example, the transition inducing packet is formed so that transition is performed between an MSB and the adjacent bit. As another embodiment, the transition inducing packet is formed so that transition is performed between an LSB and the adjacent bit.

Figure 4:
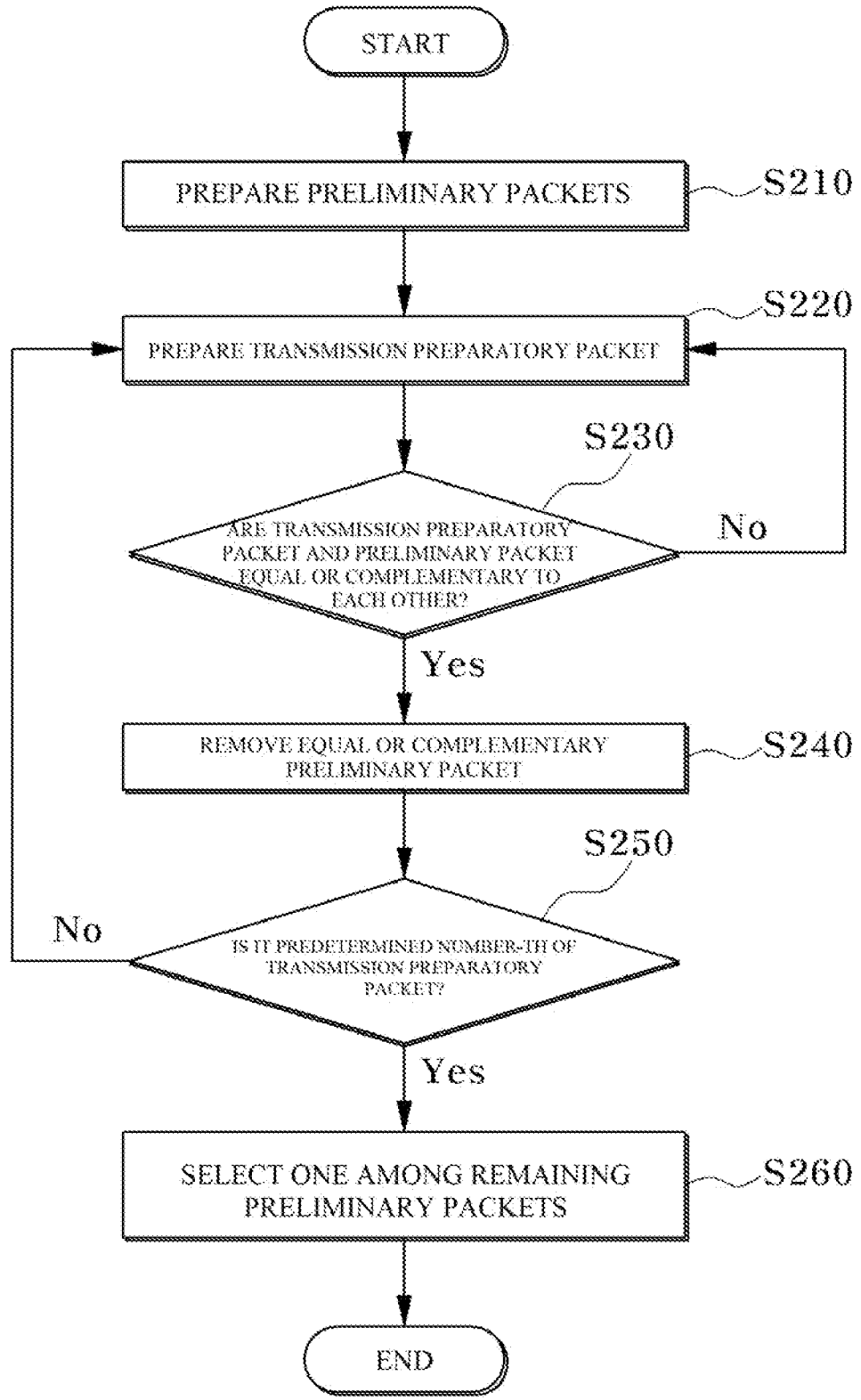
FIG. 4 is a schematic flowchart illustrating a method of forming a transition inducing packet according to an embodiment of the present invention.

A method of forming the transition inducing packet according to an embodiment of the present invention will be described with reference to FIG. 4. In operation S210, a preliminary packet having all data enabled with n bits is prepared. As an example, the number of preliminary packets enabled with 3 bits is 8 such as 000, 001, 010, 011 . . . and 111 as described above. As another example, when the transition inducing packet and the transition preparatory packet are 6 bits, the number of preliminary packets is 64 such as 000000, 000001, 000010 . . . 111111.

In operation S220, a transmission preparatory packet is prepared. As an embodiment, the transmission preparatory packet may be prepared by dividing pixel data (XD) to be transmitted by a predetermined number of bits, and corresponding transmission preparatory packets may be stored in a register. In operation 230, it is determined whether the prepared transmission preparatory packet and preliminary packet are equal or complementary to each other. In operation 240, the preliminary packet which is equal or complementary to the transmission preparatory packet is removed. This is because a transition cannot be formed in the operation result when a logical operation is performed on the preliminary packet which is equal or complementary to the transmission preparatory packet and the corresponding transmission preparatory packet.

Subsequently, in operation S250, whether the transition preparatory packet corresponds to a predetermined number is determined. As an example, in a case of the transmission preparatory packet with 6 bits as described above, one transition inducing packet can be formed using 30 transmission preparatory packets, and therefore whether the transition preparatory packet corresponds to the predetermined number is determined. However, obviously, the predetermined number should not exceed $2^{(n-1)}-1$. As an embodiment, the number of transmission preparatory packets is calculated before proceeding to the following operation. According to the present embodiment, there is no need to calculate the number of mutually different transmission preparatory packets which are prepared for forming the transition inducing packet, and therefore a configuration of a device for implementing this may be simplified. As another embodiment, the number of mutually different transmission preparatory packets is calculated before proceeding to the following operation. According to the present embodiment, since the number of mutually different transmission preparatory packets is calculated to form the transition inducing packet, the number of transition included data packets which can be transmitted together with one transition inducing packet in a transmission process later may be increased, and therefore data transmission efficiency may be improved.

In operation S260, one of the remaining preliminary packets is selected as the transition inducing packet to form the transition inducing packet. Consequently, the formed transition inducing packet is not equal or complementary to the predetermined number of transition preparatory packets. In an embodiment, when transition should be formed between an MSB and the adjacent bit of the transition inducing packet, the transition inducing packet is selected to match this. In another embodiment, when transition should be formed between an LSB and the adjacent bit, the transition inducing packet is selected to match this. In still another embodiment, when transition should be formed between any two adjacent bits, the transition inducing packet is selected to match this.

Figure 5:
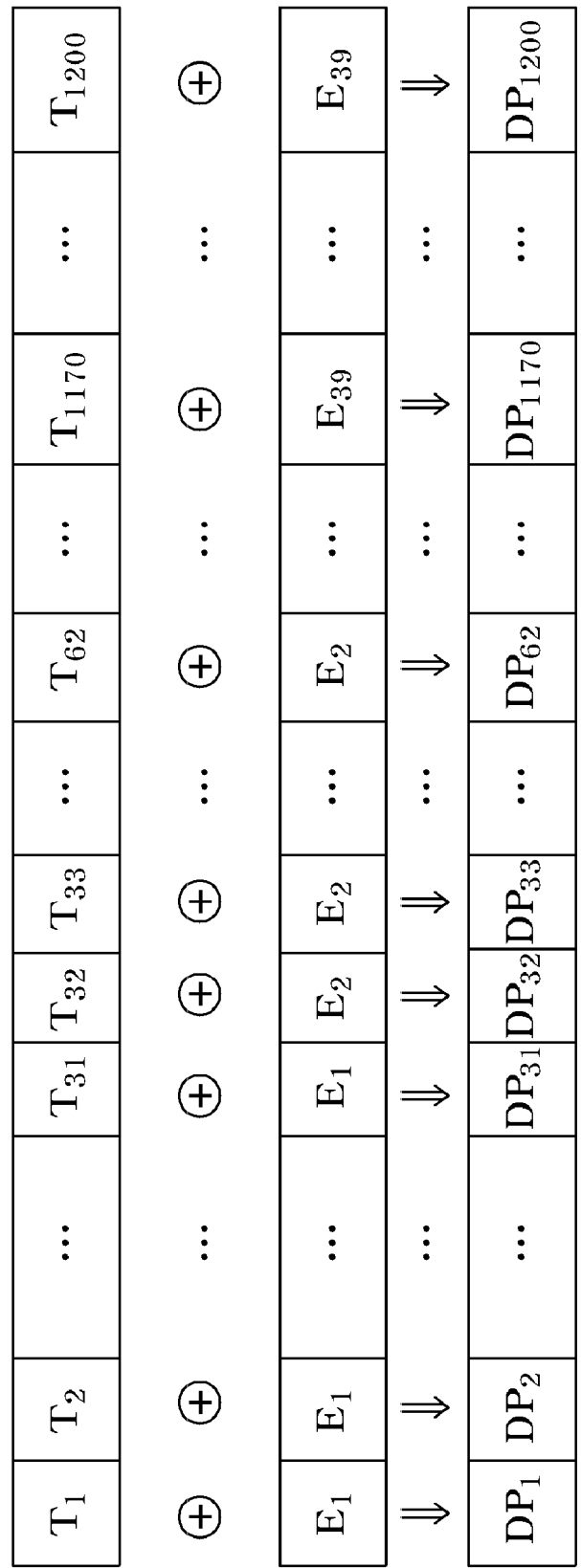
FIG. 5 is a schematic diagram illustrating a method of forming a transition included data packet.

Referring to FIGS. 1 and 5, in operation S300, transition included data packets are formed by performing a logical operation on the transmission preparatory packet (T) and the transition inducing packet (E). In an embodiment, an XOR operation is performed on respective corresponding bits of the transition preparatory packet (T) and the transition inducing packet (E). As described above, the transition preparatory packet (T) and the transition inducing packet (E) have the same number of bits. As an example, when the pixel data (XD) to be transmitted is 7200 bits and the transmission preparatory packet (T) and the transition inducing packet (E) are 6 bits, a logical operation is performed on one transition inducing packet with the transmission preparatory packet used in forming the corresponding transition inducing packet. As an example, when the number of transition preparatory packets used in forming one transition inducing packet with 6 bits is 31, the logical operation is performed on the one transition inducing packet and 31 transmission preparatory packets to form 31 data packets. Thus, by respectively performing the logical operation using the transition inducing packet E1 and the transmission preparatory packets T1 to T31, DP1, DP2 ... and DP31 are formed, and by respectively performing the logical operation using the transition inducing packet E2 and the transmission preparatory packets T32 to T62, DP32 to DP 62 are formed. In this manner, by performing the logical operation on the transition inducing packet E39 and the transmission preparatory packets T1170 to T1200, DP 1170 to DP 1200 are formed.

As another example, although not shown, when the number of transmission preparatory packets used in forming one transition inducing packet with 6 bits is 30, 30 data packets are formed by performing the logical operation on one transition inducing packet and 30 transmission preparatory packets.

TABLE 1

| Transmission preparatory packet | Transition inducing packet (E) | Transition included data packet (DP) |
|---|---|---|
| 010111 | 010011 | 000100 |
| 101101 | | 111110 |

As an example, when a first transmission preparatory packet (T) and the transition inducing packet (E) are all 6 bits as shown in Table 1, the first transmission preparatory packet and the transition inducing packet are not equal or complementary to each other. In addition, it can be seen that transition from 0 to 1 or from 1 to 0 is in the transition included data packet (DP) that is the result of the logical operation. In the same manner, it can be seen that transition from 1 to 0 is in the data packet (DP) that is the result of the logical operation between a second transmission preparatory packet and the transition inducing packet.

Since at least one transition is necessarily included in the data packet (DP) that is the result of the XOR operation, a reception unit that receives the transition included data packet restores a clock using transition as will be described later. Thus, there is no need to form a separate clock signal line as in the related art, and therefore manufacturing costs of the display may be reduced. In addition, since a position in which transition is performed is not fixed within the data packet, transition may be uniformly distributed and positioned for each packet when transmitting a plurality of data packets. As a result, EMI is reduced. In addition, since a clock signal is restored and used in a reception terminal, clock skew that occurs when separately transmitting data and the clock signal to the clock signal line may not be generated.

In an embodiment, the logical operation between the transmission preparatory packets and the transition inducing packet is performed serially. The transition included data packets (DP) are formed by aligning the result of the serially performed logical operation using an MSB to an LSB. Another embodiment, the logical operation between the transmission preparatory packets (T) and the transition inducing packet is performed in parallel. The results of the logical operation performed in parallel are serialized, and then the serialized results are aligned to match corresponding bits to form data packets (DP).

Figure 6:
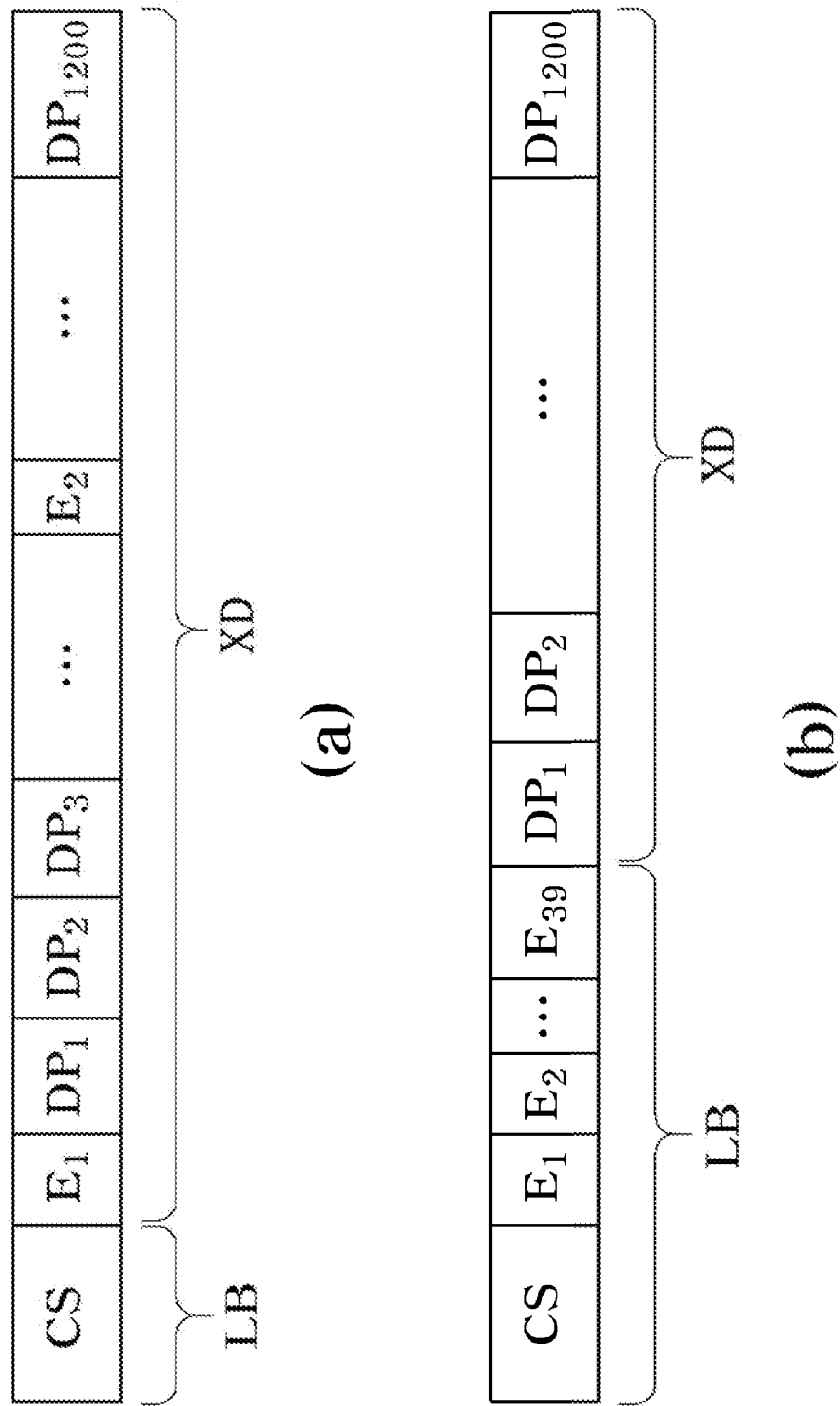
FIG. 6 is a schematic diagram illustrating a method of transmitting a transition inducing packet and transition included data packets.

FIG. 6 is a schematic diagram illustrating a method of transmitting a transition inducing packet and transition included data packets. Referring to FIGS. 1 and 6, in operation S400, the transition included data packets and the transition inducing packet are transmitted. As an embodiment, when 31 transmission preparatory packets are used in order to form one transition inducing packet (E) with 6 bits, 1200 transition included data packets and 39 transition inducing packets should be transmitted in order to transmit data with 7200 bits. As another embodiment, when 30 transmission preparatory packets are used in order to form one transition inducing packet (E) with 6 bits, 1200 transition included data packets and 40 transition inducing packets should be transmitted in order to transmit data with 7200 bits.

As an embodiment in which the transition inducing packets and transition included data packets are transmitted, the transition included data packets and the transition inducing packet are transmitted in a pixel data (XD) transmission region. As shown in FIG. 6A, before transmitting the transition included data packets, the transition inducing packet is transmitted. According to the present embodiment, since the transition inducing packet is transmitted together within a data transmission interval, transmission efficiency may be slightly reduced, but a configuration of a circuit that restores data from the data packets may be simplified. In another embodiment, a configuration in which transition inducing packets to be transmitted to a single channel are all collected and transmitted, and the transition included data packets are transmitted to a pixel data (XD) transmission region may be possible. As an example, a configuration in which the transition inducing packets are all collected and transmitted with control signals (CS) within a line blank (LB) interval shown in FIG. 6B may be possible. However, in the example shown in FIG. 6B, one transition inducing packet (E) and 31 transition included data packets (DP) are transmitted, and therefore, obviously, the number of data packets (for example, 30) that does not exceed 31 per one transition inducing packet (E) may be transmitted together. According to the present embodiment, only pixel data is transmitted to the pixel data transmission region, and therefore transmission efficiency approaches 100%. As another embodiment, although not shown, a configuration in which pixel data (XD) of any one channel is transmitted, and then a transition inducing packet of a corresponding channel or a transition inducing packet of a next channel are all collected and transmitted prior to a pixel data (XD) transmission interval of the next channel may be possible.

When the number of bits of the transition inducing packet (E) and the transmission preparatory packets are increased, a probability of occurrence of error at the time of clock restoration in a process of restoring the clock using a transition included in the data packet transmitted to a data driver is increased, and therefore complexity and accuracy of the clock restoration circuit should be increased. However, the number of transition inducing packets transmitted to the data driver is reduced, and therefore transmission efficiency is improved.

Figure 7:
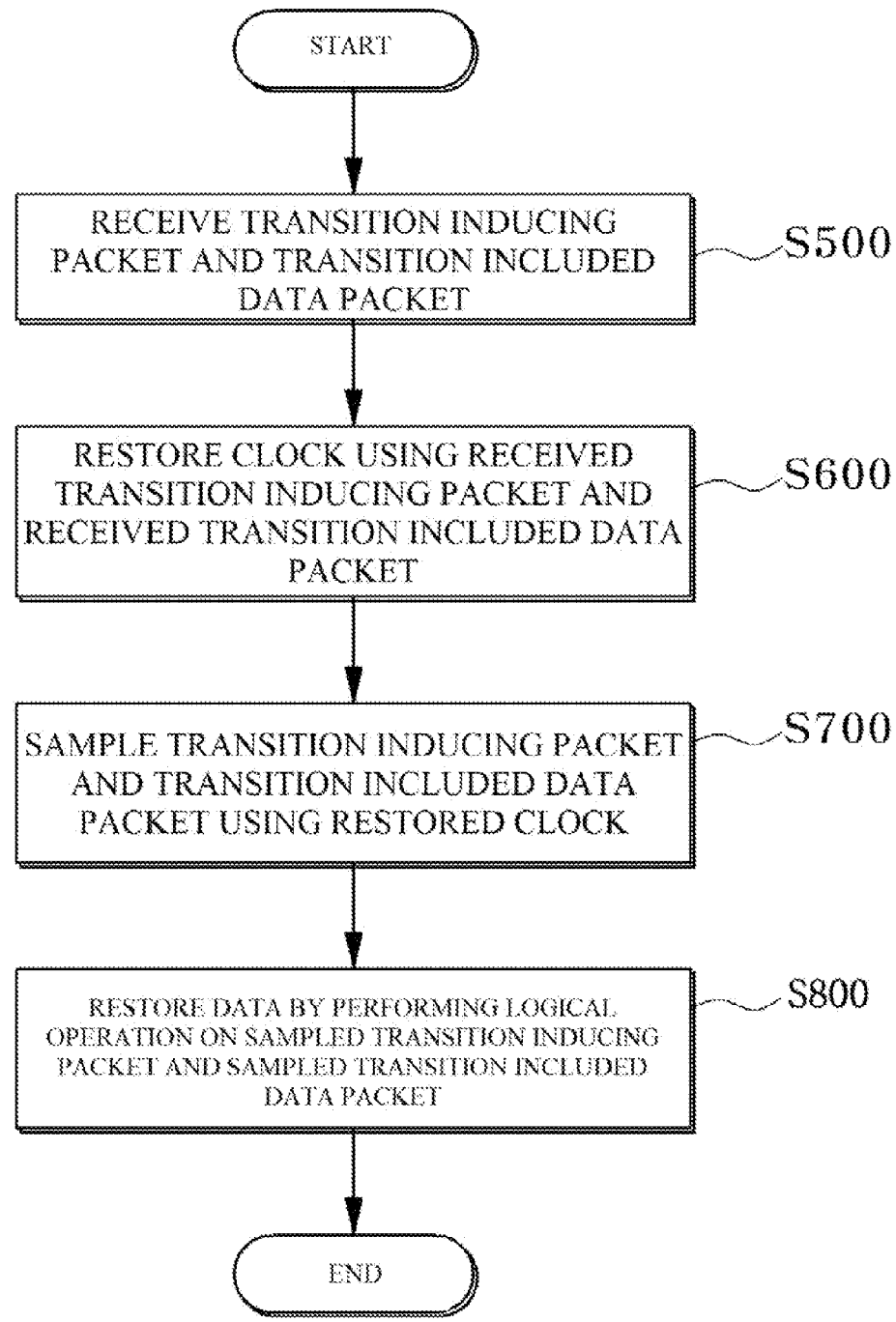
FIG. 7 is a schematic flowchart illustrating a data restoration method according to an embodiment of the present invention.

Hereinafter, a data restoration method according to an embodiment of the present invention will be described with reference to the accompanying drawings. FIG. 7 is a schematic flowchart illustrating a data restoration method according to an embodiment of the present invention. Referring to FIG. 1, in operation S500, a transition inducing packet (E) and a transition included data packet are received. Between adjacent bits of the data packet, there is at least one transition from 0 to 1 or from 1 to 0 as described above.

Figure 8:
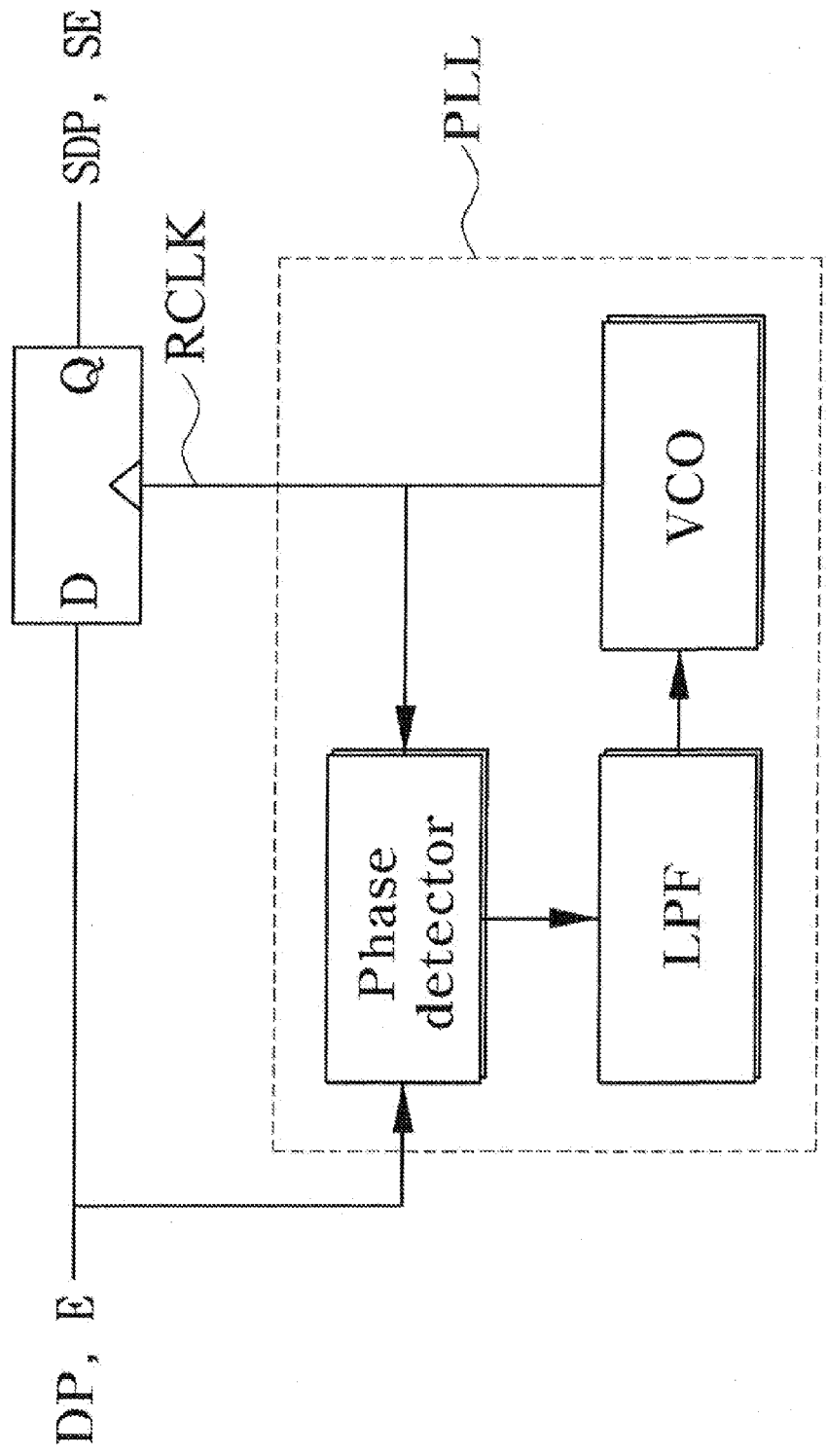
FIG. 8 is a schematic diagram illustrating a data restoration method according to an embodiment of the present invention.

FIG. 8 is a diagram illustrating an example of a configuration in which a clock signal can be restored using the received transition inducing packet (E) and the transition included data packet (DP). Referring to FIGS. 7 and 8, in operation 600, a clock is restored using the received transition inducing packet and the transition included data packet. In an embodiment, as shown in FIG. 8, the clock may be restored using a structure of a phase locked loop (PLL). When inputting the received transition included data packet (DP) or the transition inducing packet (E) and output signals of a voltage controlled oscillator (VCO) to a phase detector, the phase detector detects a phase difference between signals output from the VCO and a transition of the data packet (DP) or a phase difference between signals output from the VCO and a transition of the transition inducing packet (E). The phase detector simultaneously outputs high-band signals and phase difference signals, and therefore only the phase difference signals are obtained using a low pass filter (LPF) and an oscillation frequency is controlled by inputting the obtained phase difference signals to the VCO, thereby obtaining restored clock signals (RCLK).

In the shown configuration, obviously, a PLL may be used, or a delay locked loop (DLL) using a voltage controlled delay line (VCDL) may be used. When using the DLL, an output frequency of the PLL using the local oscillator cannot exactly coincide with a transmission frequency of the transition included data packet due to the configuration, and a minute error may occur. When such minute errors accumulate, an error may occur while being deviated from a control range of the VCDL. Thus, in order to compensate for this, a multiphase clock generated in the PLL may be used in the VCDL as an input, or an error may be prevented using a phase interpolator.

Figure 9:
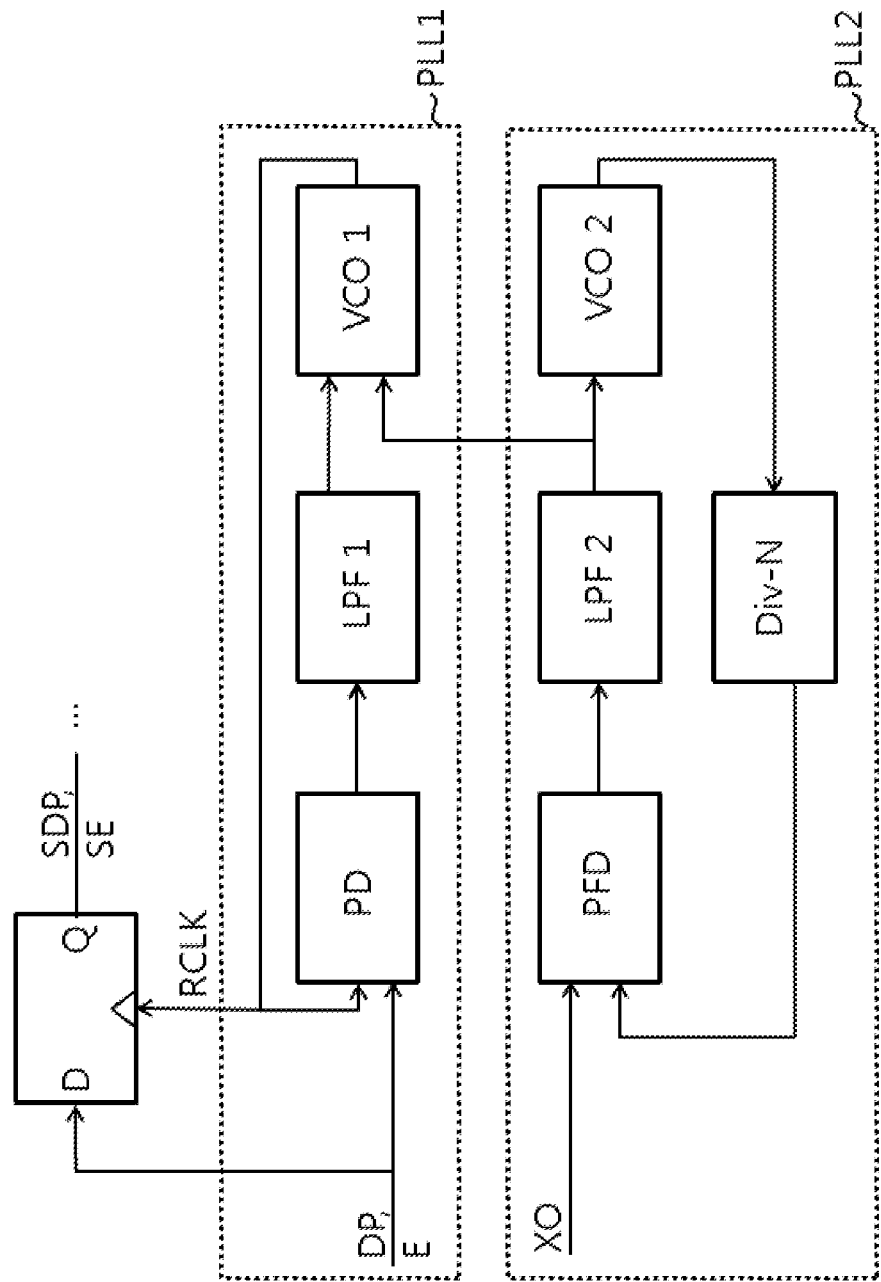
FIGS. 9 and 10 are schematic diagrams illustrating a method of tracking a clock according to an embodiment of the present invention.

In an embodiment, the data restoration method may further include tracking the clock before restoring the clock. FIG. 9 is a diagram showing an example of a configuration in which a clock is restored by tracking the clock. Referring to FIG. 9, the configuration of tracking the clock includes a second phase locked loop (PLL 2) that receives output signals (XO) of the local oscillator for outputting signals with a predetermined frequency. The PLL2 includes a phase frequency detector (PFD), an LPF2, and a VCO2, and further includes a frequency divider (Div-N). The PFD detects a frequency difference or a phase difference between the output signals (XO) of the local oscillator and signals output by the VCO 2. The signals output by the PFD include high-band signals regardless of operations of a circuit in addition to phase difference signals, and therefore only frequency difference and phase difference signals are obtained using the LPF2. The phase difference signals output by the LPF2 are input to the VCO2, and then frequency-division is performed on the input signals using the Div-N, thereby tracking a frequency of the clock.

The signals output from the LPF1 are input to the first VCO of the PLL1 for detecting a phase difference to sample data. That is, coarse tuning of clock frequency tracking is performed using the PLL2, and then fine tuning of clock phase tracking is performed using the PLL1 to restore the clock.

When the transition inducing packet (E) and the transition included data packet (DP) are input to a D flip-flop and the restored RCLK is input, the transition inducing packet and the transition included data packet are sampled to obtain the transition inducing packet and the transition included data packet which are synchronized with the transmitted clock signal. In the present embodiment, the D flip-flop is used, but sampling may be performed using a D latch, and other equivalent configurations may be possible.

Figure 10:
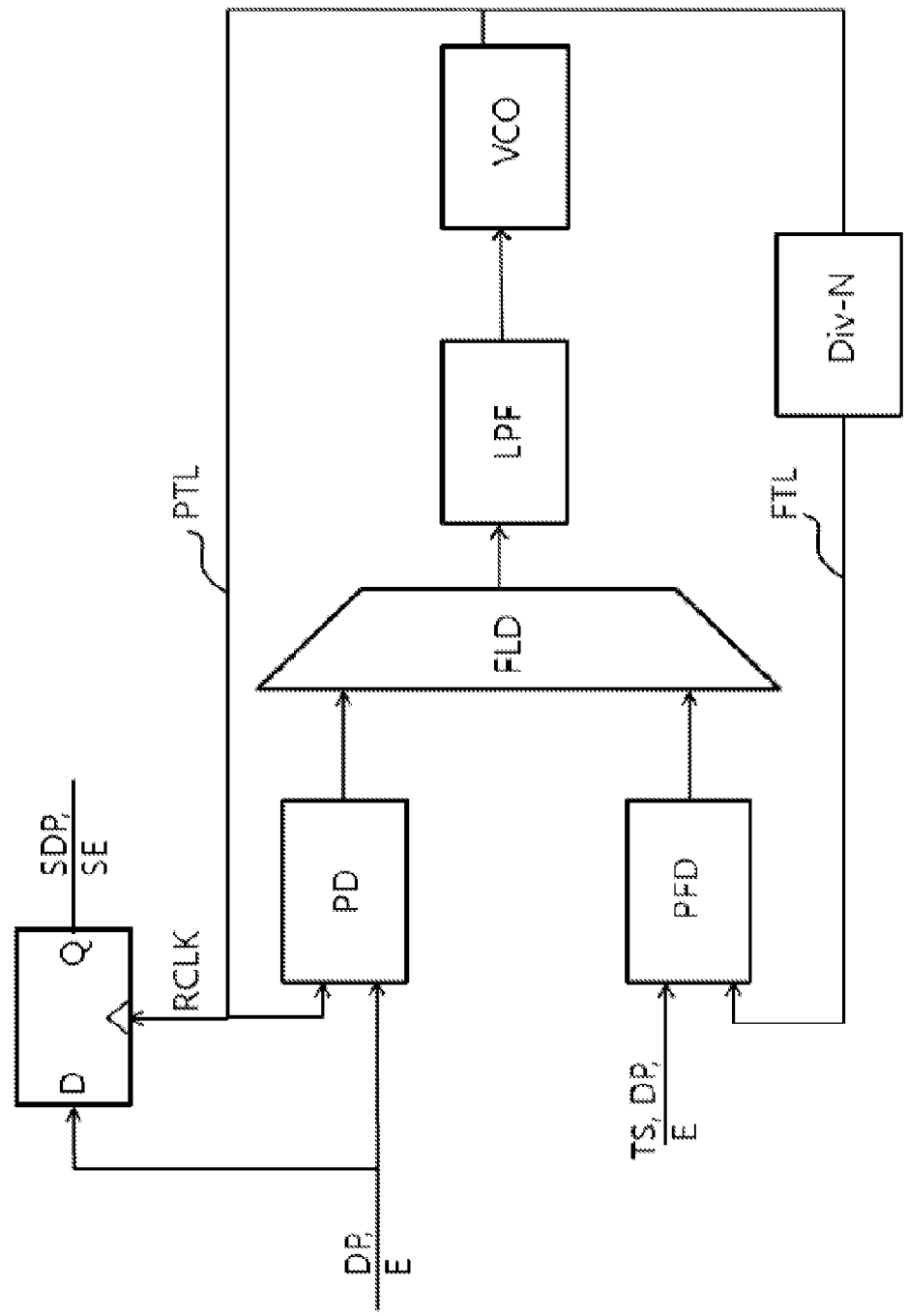

FIG. 10 is a block diagram illustrating another embodiment of a configuration of tracking the clock. When the local oscillator is not used, a double loop structure which is divided into a frequency tracking loop (FTL) and a phase tracking loop (PTL) is formed, and therefore the clock signal may be restored in the similar manner to the above embodiment. In an initial coarse tuning operation, tuning signals (TS) in which transition is formed at regular intervals are input to the phase frequency detector. In a state in which a frequency is not locked, a frequency lock detector (FLD) may connect the output to an LPF to lock the frequency. After the frequency is locked, fine tuning is performed to restore the clock. In the fine tuning process, when inputting the transition inducing packet (E) and the transition included data packet (DP) to the phase detector (PD), an FLD may connect the output of the phase detector (PD) to the LPF and the LPF may control the VCO using the phase difference signal output by the LPF to thereby restore the clock. That is, in a coarse tuning process, a clock frequency is locked by operating an FTL, and the PTL is operated when the frequency is locked, so that the clock phase is locked to restore the clock. In this manner, the transition inducing packet (E) and the transition included data packet (DP) are sampled using the restored clock (RCLK), thereby forming the sampled transition inducing packet (SE) and the sampled transition included data packet (SDP) which are synchronized with the clock signal.

FIG. 11 is a schematic diagram illustrating a process for restoring pixel data (XD) by performing a logical operation on the sampled transition inducing packet (SE) and the sampled transition included data packet (SDP). Referring to FIGS. 7 and 11, in operation S800, the logical operation is performed using the sampled transition included data packet and the sampled transition inducing packet to restore data. In an embodiment, the sampled transition inducing packet (SE) may be utilized as a seed for restoring the pixel data (XD) as described. This is based on the fact that an operation result (C) obtained by performing an XOR operation on binary data A and other binary data B and A can be obtained by performing the XOR operation with the binary data B with C. The sampled data packet (DP) is the result obtained by performing the XOR operation on the transmission preparatory packet (T) obtained by dividing data to be transmitted by a predetermined number of bits and the transition inducing packet (E) having the same number of bits, and therefore data of a corresponding part may be restored when performing the XOR operation on the sampled transition included data packet (SDP) and the sampled transition inducing packet (SE). That is, when performing a logical operation using SE1 and SDP1, T1 may be obtained. In the same manner, when performing the logical operation using SE1 and SDP2, T2 may be obtained. Thus, when performing the logical operation between the transition inducing packet and the data packets, the pixel data (XD) may be restored.

In an embodiment, referring to FIG. 6B, transition inducing packets E1, E2, E3 . . . and E39 of a corresponding line are sequentially transmitted in the line blank interval (LB), and transition included data packets DP1, DP2, DP3 . . . and DP1200 are sequentially transmitted in a pixel data transmission interval (XD). A reception end samples and stores the transition inducing packets E1, E2, E3 . . . and E39 sequentially transmitted during the LB interval using the restored clock (CLK), and then restores the pixel data by performing an XOR operation with the sequentially transmitted data packets using the stored transition inducing packets SE1, SE2, SE3 . . . and SE39. In this manner, all of the pixel data (XD) may be restored.

In another embodiment, referring to FIG. 6A, after the line blank (LB) interval, an initial transition inducing packet (E1) is received. Next, the sequentially received transition included data packets DP1, DP2 . . . and DP31 and the transition inducing packet (E1) are sampled, and then the logical operation is performed, thereby restoring the pixel data. Next, the following transition inducing packet (E2) is received, data packets DP32 . . . and DP62 sequentially received using the transition inducing packet (E2) are sampled, and then the logical operation is performed, thereby restoring the pixel data of the following region. Thus, according to the present embodiment, all of the pixel data may be restored.

As an embodiment in which the pixel data is restored, the sampled transition inducing packet (SE) and the sampled transition included data packet (SDP) are deserialized, and then the logical operation is performed bit-wise, thereby obtaining the pixel data synchronized with the transmission clock. In this manner, after deserializing, the bit-wise logical operation is performed, thereby achieving a high operation speed. The logical operation in this operation may be implemented in a software manner, and obviously implemented in a hardware manner. Next, the synchronized pixel data is processed by a desired number of bits, and then transmitted to a corresponding scan driver, thereby driving a display.

In the above-described communication method, an example of data communication between a timing controller and a data driver in an information display device has been described, but this is merely for clear and concise description, and not intended to limit the scope of the present invention. By changing the technical idea of the present invention by the skilled person, the present invention is obviously used in data communication between any one device and another device.

As described above, according to the embodiments of the present invention, data may be transmitted with high efficiency, and the transmitted data may be restored. According to the embodiments of the present invention, a position in which transition is performed is uniformly distributed without being locked in transition included data packets to be transmitted, and therefore effects due to EMI may be reduced. According to the embodiment of the present invention, data may be restored using the clock restored in the reception terminal, and therefore problems such as clock skew and jitter may be overcome.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A data transmission method comprising:
   forming a plurality of transmission preparatory packets by dividing data to be transmitted by the predetermined number (n) of bits;
   forming transition inducing packets different from the transmission preparatory packets while having the predetermined number (n) of bits;
   forming transition included data packets by performing a logical operation on the transition inducing packet and each of the transmission preparatory packets; and
   transmitting the transition included data packets and the transition inducing packet.

2. The data transmission method of claim 1, wherein the forming of the plurality of transmission preparatory packets includes forming the transmission preparatory packet by inserting a dummy bit when the number of bits of the data to be transmitted cannot be divided by the predetermined number (n) of bits.

3. The data transmission method of claim 1, wherein the forming of the transition inducing packets includes
   setting preliminary packets having all pieces of data that can be formed by the predetermined number (n) of bits,
   comparing the preliminary packets and the transmission preparatory packets,
   removing the preliminary packet equal or complementary to the transmission preparatory packet based on the comparison result, and
   selecting any one of the preliminary packets which remain without being removed as the transition inducing packet.

4. The data transmission method of claim 3, wherein the comparing of the preliminary packets and the transmission preparatory packets includes comparing a predetermined number of transmission preparatory packets and a predetermined number of preliminary packets.

5. The data transmission method of claim 4, wherein the comparing of the predetermined number of transmission preparatory packets and the predetermined number of preliminary packets includes comparing 1 or more and $2^{(n-1)}-1$ or fewer transmission preparatory packets and preliminary packets.

6. The data transmission method of claim 1, wherein the forming of the transition inducing packets includes forming the transition inducing packets so that transition is formed between two adjacent bits which are set in advance among the transition inducing packets.

7. The data transmission method of claim 6, wherein the forming of the transition inducing packets so that transition is performed between the two adjacent bits includes forming the transition inducing packets so that transition is performed in any one of between a most significant bit (MSB) and a single adjacent bit and between a least significant bit (LSB) and a single adjacent bit.

8. The data transmission method of claim 3, wherein the comparing of the preliminary packets and the transmission preparatory packets includes comparing the preliminary packets and the transmission preparatory packets which are different from each other.

9. The data transmission method of claim 1, wherein the forming of the transition included data packets includes forming the transition included data packets by performing an exclusive OR (XOR) operation on the transition inducing packet and each of the transmission preparatory packets.

10. The data transmission method of claim 1, wherein the forming of the transition included data packets includes forming the transition included data packets by performing an XOR operation on 1 or more and $2^{(n-1)}-1$ or fewer transmission preparatory packets and transition inducing packet.

11. The data transmission method of claim 1, wherein the transmitting of the transition included data packets and the transition inducing packet includes transmitting the transition inducing packet during a line blank period.

12. The data transmission method of claim 1, wherein the transmitting of the transition included data packets and the transition inducing packet includes transmitting the transition included data packets and the transition inducing packet during a pixel data transmission period.

13. The data transmission method of claim 1, wherein the transmitting of the transition included data packets and the transition inducing packet includes transmitting the transition inducing packet after a pixel data transmission period.

14. The data transmission method of claim 1, wherein the transmitting of the transition included data packets and the transition inducing packet includes transmitting the transition included data packets after transmitting a single transition inducing packet.

15. The data transmission method of claim 1, wherein formed transition inducing packet is different from each of the transmission preparatory packets.

16. The data transmission method of claim 1, wherein formed transition inducing packet is not complimentary to each of the transmission preparatory packets.

17. A data restoration method comprising:
   receiving a transition inducing packet and a transition included data packet;
   restoring a clock using the received transition included data packet and the received transition inducing packet;

sampling the transition inducing packet and the transition included data packet using the restored clock; and restoring transmitted data by performing a logical operation on the sampled transition inducing packet and the sampled transition included data packet.

18. The data restoration method of claim 17, wherein the restoring of the transmitted data by performing the logical operation includes restoring the transmitted data by deserializing the sampled transition inducing packet and the sampled transition included data packet, and restoring the transmitted data by performing a bit-wise logical operation on the deserialized transition inducing packet and transition included data packet.

19. The data restoration method of claim 17, wherein the restoring of the transmitted data by performing the logical operation includes restoring the transmitted data by performing an XOR operation on the received transition included data packets and transition inducing packet.

20. The data restoration method of claim 17, wherein the restoring of the clock includes restoring the clock using a phase locked loop (PLL).

21. The data restoration method of claim 17, further comprising, before the restoring of the clock:

tracking a clock.

22. The data restoration method of claim 21, wherein the tracking of the clock includes tracking the clock using a PLL with a double loop structure which is divided into a frequency tracking loop and a phase tracking loop.

23. The data restoration method of claim 21, wherein the tracking of the clock includes tracking the clock using a PLL.

* * * * *